Figure 1:
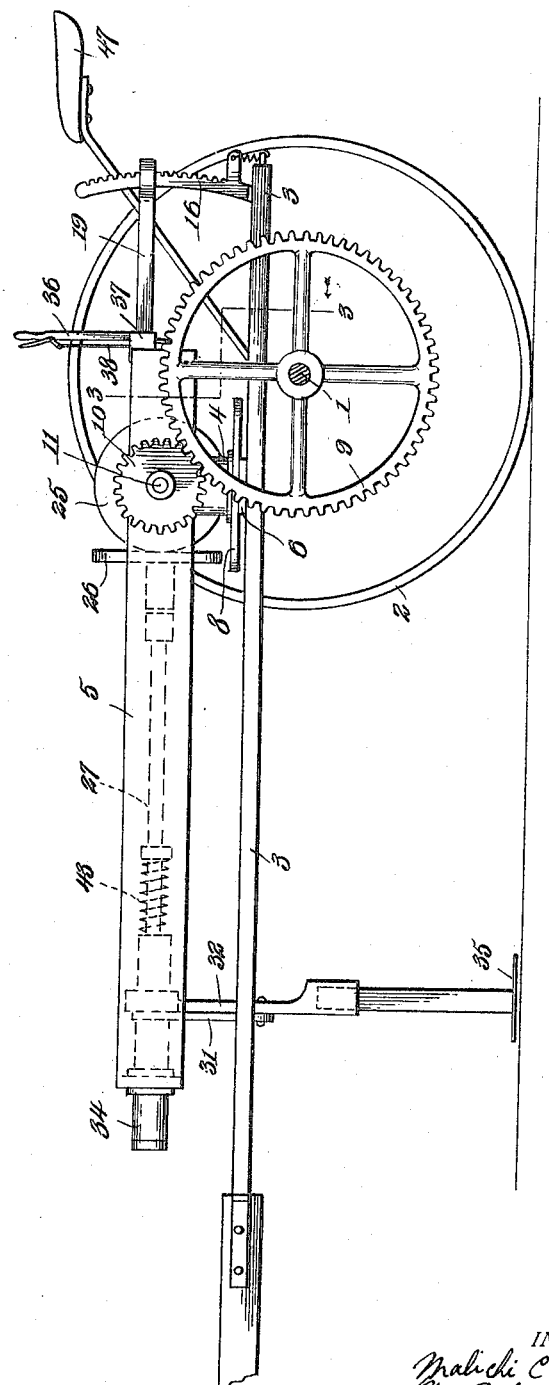

M. C. BREWER.
COTTON CHOPPING MACHINE.
APPLICATION FILED APR. 19, 1913.

1,136,930.

Patented Apr. 27, 1915.
3 SHEETS—SHEET 1.

WITNESSES

INVENTOR

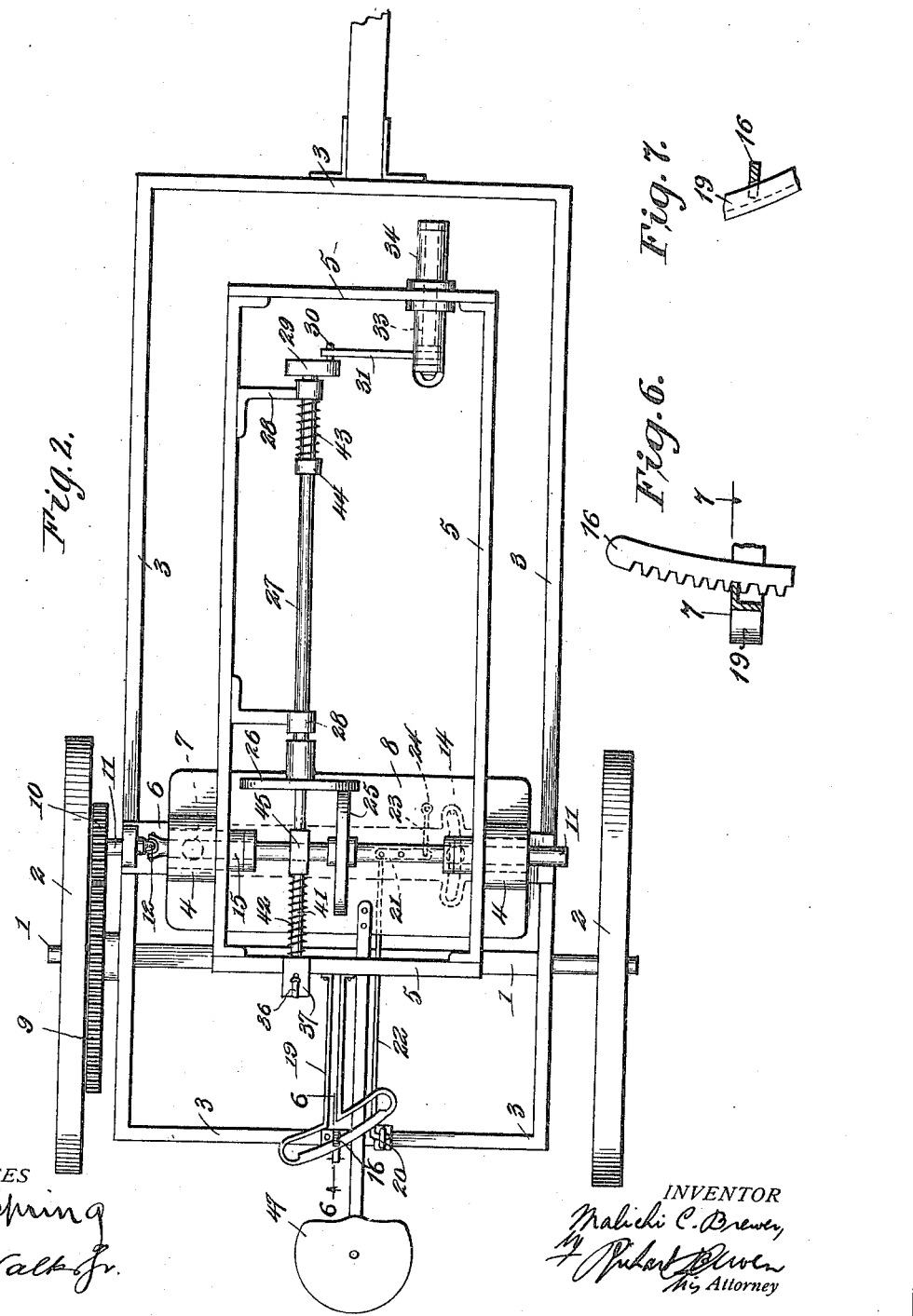

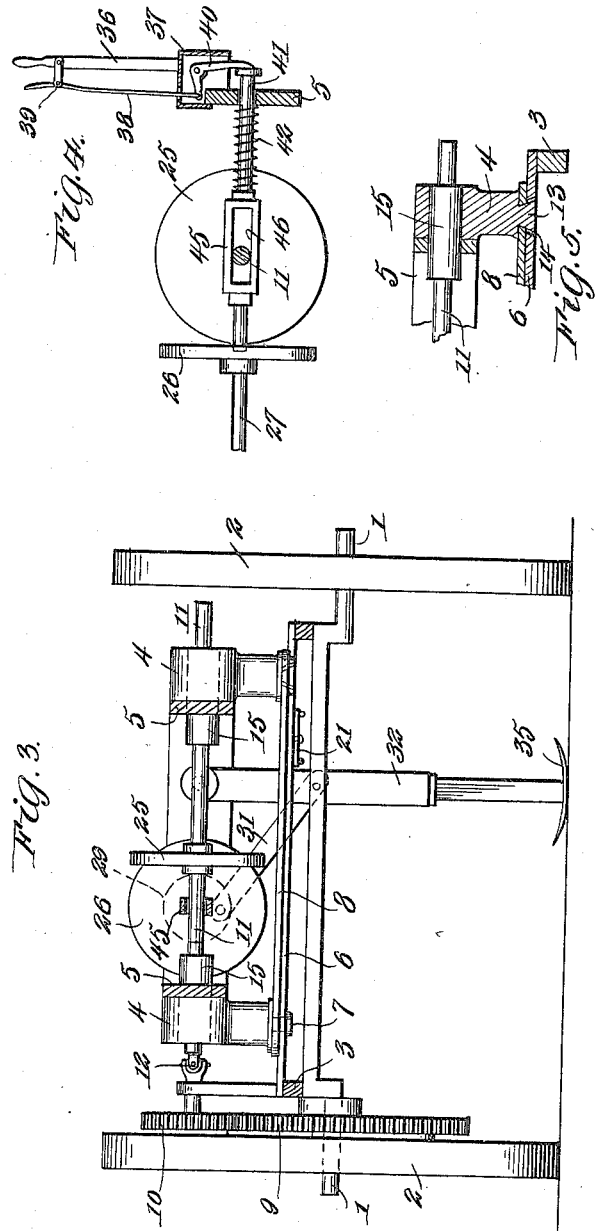

UNITED STATES PATENT OFFICE.

MALICHI C. BREWER, OF NASHVILLE, TENNESSEE.

COTTON-CHOPPING MACHINE.

1,136,930.  Specification of Letters Patent.  Patented Apr. 27, 1915.

Application filed April 19, 1913. Serial No. 762,316.

*To all whom it may concern:*

Be it known that I, MALICHI C. BREWER, a citizen of the United States, residing at Nashville, in the county of Davidson and State of Tennessee, have invented certain new and useful Improvements in Cotton-Chopping Machines, of which the following is a specification.

This invention relates to improvements in machines for chopping and thinning cotton, and the primary object of the invention is to improve the construction and facilitate the operation of that class of cotton choppers in which the chopping mechanism is actuated in approximately an elliptical path at right angles to and across the row of cotton plants.

A further object of the invention resides in the provision of means whereby lateral adjustment of the chopping blade may be accomplished during the forward movement of the machine without in any way interfering with or altering the course of the said machine.

A still further object of the invention contemplates the provision of means including a pivotally supported supplementary frame whereby vertical adjustment of the cutting or chopping blade is permitted for varying the degree or extent of the cut, or for allowing certain cotton plants to remain uncut if so desired.

A still further object of the invention contemplates the provision of a machine of this character whereby motion is derived by suitable gearing, from the main axle of the machine upon which the supporting wheels are arranged, the said machine adapted to be operated or forwarded (if desired) independent of the operating mechanism carried thereby.

The invention still further resides in the provision of a cotton chopping machine which is not only simple and durable in construction but reliable and efficient in operation and one which can be manufactured and placed upon the market at a comparatively low cost, the said machine being adapted if occasion demands, to be operated in connection with a cultivator of any of the well known types.

The above and additional objects are accomplished by such means as are illustrated in the preferred embodiment in the accompanying drawings, described in the following specification and then more particularly pointed out in the claims which are appended hereto.

In describing the invention in detail, reference will be had to the accompanying drawings wherein like characters denote like or corresponding parts throughout the several views and in which;

Figure 1 is a side elevation of a machine construction in accordance with my invention, one of the supporting wheels being removed; Fig. 2 is a top plan view of the machine; Fig. 3 is a section on the line 3—3 of Fig. 1; Fig. 4 is an enlarged elevation of the means employed for throwing the mechanism into and out of operative condition; and Fig. 5 is an enlarged sectional view of one of the bearings. Fig. 6 is a section on the line 6—6 of Fig. 2; and Fig. 7 is an enlarged section on the line 7—7 of Fig. 6.

Referring now to the drawings wherein is illustrated the preferred form of my invention, the numeral 1 designates the main shaft or axle of the machine having the usual supporting wheels 2 arranged upon each end thereof, the said axle or shaft supporting the main frame 3 of the machine. Arranged in spaced relation to the said frame 3, and supported thereover by means of suitable bearings, designated in their entirety by the numeral 4 I provide a second or supplementary frame 5 upon which is mounted the operating mechanism comprising the invention.

A brace bar or beam 6 extends across the main frame 3 of the machine and has pivotally supported thereon through the medium of an upwardly projecting stud 7, a suitable plate 8, the latter adapted to be swung upon its pivot point 7 for laterally adjusting the cutting blade of the machine in a manner to be hereinafter fully described.

A gear wheel 9 is keyed or otherwise fixedly secured to the main shaft 1 of the machine for imparting motion to the several mechanisms comprising the invention, the said wheel 9 meshing into a smaller gear wheel 10 mounted upon one end of a driving shaft 11, the said shaft being journaled within the bearings 4 above mentioned. One of the bearings 4, the one into which the stud 7 extends, is fixedly mounted upon the plate member 8 adjacent the gear wheel 10 from which point lateral, as well as vertical movement or adjustment of the supplementary frame is provided. To facilitate both vertical and lateral adjustment of the frame, the latter being carried by the power shaft 11, a universal coupling 12 is provided for the said shaft, the said coupling being disposed adjacent the stud or projection 7 by means of which the supplementary frame is pivotally supported upon the brace bar or beam 6. The bearing upon the opposite side of the plate member 8 has a dove-tail projection 13 formed integrally therewith, the said projection extending through an arcuate slot 14 formed within the beam 6 and described from the pivotal point created by the stud 7. The provision of the said dove tail projection 13 is adapted to limit the pivotal movement of the said plate and the supplementary frame 5 supported thereupon as well as produce a secure connection between the said bearing and the said plate. A sleeve 15 is arranged upon the power shaft 11 near each end thereof, the said sleeve fitting within the bearings 4 and extending or projecting inwardly toward the center of the machine so as to allow the sides of the supplementary frame 5 to be loosely mounted thereupon.

A spring actuated segmental rack 16 is disposed upon the rear end of the main frame 3 for the purpose of supporting the supplementary frame 5 in its vertically adjusted position, said rack being adapted for engagement with a bracket 19 affixed to the supplementary frame, the free end of the bracket being provided with an arcuate extension, open, as shown to advantage in Fig. 2 to provide for the reception of the said rack bar 16. During lateral adjustment of the supplementary frame, the rack bar 16 is adapted to operate or engage the arcuate outer edge of the arched extensions of the bracket 19, such engagement permitting the desired lateral adjustment yet at the same time preventing any vertical adjustment by reason of the engagement of the teeth of the rack bar with the bracket. Were it desired that the supplementary frame 5 be vertically adjusted, rack bar 16 is moved against its spring retaining means until the teeth thereof disengage the arched portion of the bracket, in which event said supplementary frame is bodily moved vertically or upon its pivotal support.

Having described the means employed for vertically adjusting the frame 5, the detail construction and operation of the means provided for the purpose of laterally adjusting the said frame will now be set forth. By pivotally mounting the plate 8 upon the stud 7 and limiting the pivotal movement of the said plate by means of the arcuate slot 14 above mentioned, it will be seen that the forward end of the said frame is swung laterally when the plate 8 is moved or swung upon its fixed pivot. A second hand lever 20 is arranged upon the main frame 3 and is secured to a pivoted link member 21 disposed upon the under face of the brace bar or beam 6 by means of a connecting rod 22. The opposite end of the said pivoted link 21 from that to which the rod 22 is connected is also provided with a connecting rod 23, the extremity of which is in turn connected to the under face of the plate member 8 as is clearly shown at 24 in Fig. 2 of the drawings. By shifting or operating the hand lever 20, it will be seen that the link member 21 is swung upon its pivot to effect the desired pivotal movement of the plate member 8, which will in turn swing the supplementary frame 5 in the desired manner.

A disk 25 is keyed or otherwise fixedly secured to the power shaft 11 of the machine and adapted to frictionally engage a second disk 26 likewise mounted upon a shaft 27, journaled within bearings 28 carried by the supplementary frame 5, the said shaft 27 extending in a transverse direction to that of the power shaft 11. A wheel or disk 29 is secured upon the forward end of the shaft 27 and has projecting from one face thereof an eccentrically mounted pin 30, upon which a crank arm 31 is loosely mounted, the said arm being connected at its opposite end to a depending blade supporting arm 32, the latter being loosely mounted upon a third shaft 33 arranged within a bearing 34 supported by the supplementary frame 5 at the forward end thereof. The cutting blade 35 of the machine is carried by the depending arm or link 32, the said blade having a cutting edge formed upon each side thereof as is clearly shown in Fig. 3 of the drawings. Motion being imparted to the shaft 27 through the medium of the disks 25 and 26, it will be seen that an oscillatory movement is imparted to the blade 35 by reason of its pivotal support taken in connection with the eccentrically disposed pin of the wheel 29, this construction operating the said blade 35 in an oscillatory manner transversely of the rows over which the machine is traveling.

Proceeding now to the description of the means employed for throwing the disks 25 and 26 out of frictional engagement, the numeral 36 designates a hand lever fixedly supported upon an enlargement or casing 37 formed upon the rear end of the supplementary frame 5, the said lever having a hand operated connecting rod 38 pivoted thereto as at 39 by means of which a bell crank lever 40 arranged within the said casing 37 is operated, one end of the said lever 40 is adapted to normally engage the rear end of a rod 41, the forward end of the said rod abutting against the rear face of the friction disk 26. By operating the bell crank lever as above set forth, the said rod 41 is forced forwardly, such forward movement forcing the shaft 27 in a like manner and the wheel 26 out of frictional engagement with the wheel 25 of the power shaft 11, thereby allowing the said shaft 11 to rotate without imparting motion to the oscillating blade 35. A spring 42 is disposed upon the rod 41 for normally holding the said rod out of firm engagement with the disk 26, while a spring 43 is arranged or disposed upon the shaft 27 for forcing the said shaft and the wheel 26 back into frictional engagement with the disk 25, the moment the operating rod 38 is released, the said spring 43 engaging the collar 44 carried by the said shaft. A bracket or link 45 is formed upon the rod 4 through which the power shaft 11 extends, the said bracket 45 having an elongated opening 46 formed therein so as to allow the said shaft 11 to extend therethrough without in any way interfering with the functions required of the said rod 41.

It will be seen from the above, taken in connection with the accompanying drawings that the operator from his seat 47 arranged at the rear of the machine, has absolute control of the various adjustments necessary in operating the machine; that the hoe or cutting blade 35 is kept on the cotton row at all times by reason of the lateral adjustment provided for the supplementary frame 5; and that the said hoe or blade may be raised or lowered as occasion demands for varying the degree or extent of cut by operating the hand lever 17 provided for that purpose.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction proportion and arrangement of parts may be resorted to, when required, without sacrificing any of the advantages of my invention.

Having thus fully described my invention, what I claim as new and desire to secure by Letters Patents is:

1. In a cotton chopping machine, a main frame, an operating shaft therefor, a supplemental frame mounted for vertical pivotal movement upon the said operating shaft, a base plate to which the said supplemental frame is secured, the said base plate being pivoted to the said main frame at one side thereof, means carried by the said base plate and engaging the said main frame to limit the pivotal movement of the said supplemental frame, and means carried by the said main frame for laterally and vertically adjusting the said supplemental frame independent of the said main frame, as and for the purpose set forth.

2. In a cotton chopping machine, a main frame, a supplemental frame disposed above the said main frame, a base plate to which the said supplemental frame is secured, an operating shaft carried by the said base plate, the said shaft adapted to form a pivotal support for the said supplemental frame, means carried by the said main frame for vertically adjusting the said supplemental frame upon the pivot formed by the said operating shaft, a stud carried by the said main frame at one side thereof, a bearing for the said stud, carried by the said base plate, the said supplemental frame adapted to be pivotally supported by the said stud, means carried by the said base plate and engaging the said main frame for limiting the lateral pivotal movement of the said supplemental frame, and means carried by the said main frame for laterally adjusting said supplemental frame, as and for the purpose set forth.

3. In a cotton chopping machine, a main wheeled frame, a plate member pivotally mounted upon the said main frame, bearings carried by the said plate member, a driven shaft journaled within the said bearings, the said shaft being connected to the wheels of the machine, a depending projection formed upon one of said bearings extending through an opening formed within the said main frame for limiting the pivotal movement of the said plate member, a supplementary frame carried by the said plate member, the said supplementary frame being loosely mounted upon the said driven shaft, means for vertically adjusting the said supplementary frame, and means for laterally adjusting the frame independent of the said vertical adjustment.

4. In a cotton chopping machine, a main wheeled frame, a brace beam extending transversely of the frame, a plate member pivotally mounted upon the said beam near one end thereof, bearings carried by the said plate at each end thereof, a stud shaft projecting from the said beam into one of the said bearings for pivotally mounting the said plate member, a projection depending from the opposite bearing extending through an arcuate slot formed within the said brace beam for limiting the pivotal movement of the said brace member, a driven shaft journaled within the said bearings, means for imparting motion to the said driven shaft from the wheels of the machine, a supplementary frame loosely mounted upon the said driven shaft, and means for vertically adjusting the said frame.

5. In a cotton chopping machine, a main wheeled frame, a brace beam extending transversely of the said frame, a plate member pivotally mounted upon the said beam, bearings disposed upon each end of the said plate member, a vertically extending stud shaft projecting into one of the said bearings and through the said plate member for pivotally mounting the latter upon the said beam, a dove tail projection depending from the said bearings extending through an arcuate slot formed within the said beam for limiting the movement of the said plate member, sleeves loosely mounted within the said bearings, a driven shaft journaled within the said sleeves of the bearings, means for rotating the said driven shaft according to the rotation of the wheels of the machine, a supplementary frame pivotally mounted upon the said sleeves, and means including a pair of levers arranged upon the said main frame for laterally or vertically adjusting the said supplementary frame.

6. In a cotton chopping machine, a main frame, a supplementary frame carried by the said main frame, means for laterally adjusting the said supplementary frame, a driven shaft upon which the said supplementary frame is mounted, means for vertically adjusting the said supplementary frame, means connecting the said driven shaft to the wheels of the machine, a second shaft carried by the said supplementary frame, friction disks carried by the said two shafts for imparting movement to the said second mentioned shaft from the said driven shaft, a wheel carried by the said second mentioned shaft, a chopping blade carried by the said supplementary frame, and means including an arm eccentrically mounted upon the said wheel and connected to the said blade for oscillating the latter according to the rotation of the said second mentioned shaft.

7. In a cotton chopping machine, a main wheeled frame, a pivotally mounted plate member carried by the said frame, bearings carried by the said plate member, a driven shaft journaled within the said bearings, a supplementary frame pivotally mounted upon the said bearings, means for imparting motion to the said driven shaft according to the rotation of the wheels of the machine, a second shaft carried by the said supplementary frame extending in a transverse direction to the said first mentioned shaft, friction disks carried by the said two shafts for imparting motion from one to the other thereof, spring control means carried by the said supplementary frame for longitudinally sliding the said second mentioned shaft and throwing the said two disks out of frictional engagement, a wheel mounted upon the said second mentioned shaft, a chopping blade pivotally suspended from the said supplementary frame, and means including an eccentrically mounted arm depending from the said wheel and connected to the said blade for oscillating the latter according to the rotation of the said second mentioned shaft.

8. In a cotton chopping machine, the combination of a main wheeled frame, a brace beam extending transversely thereof, a plate member pivotally mounted near one end of the said beam, bearings disposed upon the said plate member, a dove tail projection depending from one of the said bearings extending through an arcuate slot formed within the said beam for limiting the pivotal movement of the said plate member, sleeves carried by the said bearings, a driven shaft journaled within the said sleeves, means for imparting motion to the said driven shaft from the wheels of the machine, a supplementary frame carried by the said plate member and pivotally mounted upon the said sleeves, and means including a pair of hand levers arranged upon the main frame for laterally and vertically adjusting the said supplementary frame, a second shaft extending transversely of the said first mentioned shaft, friction disks carried by the said two shafts for imparting motion from one to the other thereof, a bar slidably mounted upon the said supplementary frame adapted to engage the disk of the second mentioned shaft, spring control means for sliding the said bar for disengaging the said two disks, a wheel carried by the said second mentioned shaft, a chopping blade pivotally suspended from the said supplementary frame, and means including an arm eccentrically mounted upon the said wheel and connected to the said blade for oscillating the latter according to the rotation of the said second mentioned shaft.

In testimony whereof I affix my signature in presence of two witnesses.

MALICHI C. BREWER.

Witnesses:
 F. H. SMALLWOOD,
 IRA W. BREWER.